(12) United States Patent
Chen et al.

(10) Patent No.: US 9,610,668 B2
(45) Date of Patent: Apr. 4, 2017

(54) CNC DUAL-SPINDLE TRANSMISSION DEVICE

(71) Applicant: Feng-Tien Chen, Taichung (TW)

(72) Inventors: Feng-Tien Chen, Taichung (TW); Chun-Chieh Chen, Nantou County (TW)

(73) Assignee: FENG-TIEN CHEN, Taichung (TW)

(*) Notice: Subject to any disclaimer, the term of this patent is extended or adjusted under 35 U.S.C. 154(b) by 99 days.

(21) Appl. No.: 14/681,094

(22) Filed: Apr. 8, 2015

(65) Prior Publication Data
US 2016/0193669 A1 Jul. 7, 2016

(30) Foreign Application Priority Data

Jan. 6, 2015 (TW) ............................. 104100284 A

(51) Int. Cl.
*B23Q 1/01* (2006.01)
*B23Q 39/02* (2006.01)
(Continued)

(52) U.S. Cl.
CPC .......... *B23Q 39/023* (2013.01); *B23B 39/161* (2013.01); *B23C 1/08* (2013.01); *B23Q 1/017* (2013.01); *B23Q 5/34* (2013.01); *B23Q 5/40* (2013.01); *B23Q 39/021* (2013.01); *B23Q 2039/006* (2013.01); *Y10T 408/385* (2015.01);
(Continued)

(58) Field of Classification Search
CPC .......... B23Q 1/01; B23Q 1/017; B23Q 1/012; B23Q 1/015; B23Q 1/70; B23Q 5/34; B23Q 5/40; B23Q 5/44; B23Q 5/42; B23Q 39/02; B23Q 39/021; B23Q 39/023; B23Q 39/028; B23Q 39/024; B23Q 2039/006;
(Continued)

(56) References Cited

U.S. PATENT DOCUMENTS

| 6,145,178 A | * | 11/2000 | Green | B23Q 5/40 |
| | | | | 29/26 A |
| 7,544,025 B2 | * | 6/2009 | Hillinger | B23Q 1/282 |
| | | | | 408/13 |
| 2012/0107064 A1 | * | 5/2012 | Chen | B23Q 39/023 |
| | | | | 409/203 |

FOREIGN PATENT DOCUMENTS

| EP | 1479475 A1 | * | 11/2004 | | B23Q 1/01 |
| JP | 61065710 A | * | 4/1986 | | |

(Continued)

*Primary Examiner* — Daniel Howell
*Assistant Examiner* — Nicole N Ramos
(74) *Attorney, Agent, or Firm* — Leong C. Lei

(57) ABSTRACT

A CNC dual-spindle transmission device is installable on a CNC dual-spindle machining center to receive first and second spindles of the CNC dual-spindle machining center to mount thereto. The CNC dual-spindle machining center includes a base, a machining table movably mounted on the base, and a vertical column erected upright at a rear portion of the base. The CNC dual-spindle transmission device includes a linear rail assembly mounted to the vertical column, a first slide seat slidably mounted to the linear rail assembly and receiving the first spindle to mount thereto, a second slide seat extending across the first slide seat and slidably mounted to the linear rail assembly in a manner of being spaced from the first slide seat to receive the second spindle to mount thereto, and first and second power units mounted to the vertical column to respectively driven the first and second slide seats to move.

10 Claims, 15 Drawing Sheets

(51) Int. Cl.
  *B23B 39/16*   (2006.01)
  *B23Q 5/40*    (2006.01)
  *B23C 1/08*    (2006.01)
  *B23Q 5/34*    (2006.01)
  *B23Q 39/00*   (2006.01)

(52) U.S. Cl.
  CPC *Y10T 408/3811* (2015.01); *Y10T 409/307168* (2015.01); *Y10T 409/307784* (2015.01)

(58) Field of Classification Search
  CPC . B23Q 2039/002; B23B 39/16; B23B 39/161; B23C 1/08; B23C 1/04
  USPC ...................... 409/203, 192; 408/53, 46, 102
  See application file for complete search history.

(56) References Cited

FOREIGN PATENT DOCUMENTS

| | | | |
|---|---|---|---|
| JP | 2004130505 A | * | 4/2004 |
| JP | 2007075995 A | * | 3/2007 |

\* cited by examiner

CNC DUAL-SPINDLE TRANSMISSION DEVICE

TECHNICAL FIELD OF THE INVENTION

The present invention relates generally to a CNC (Computer Numeric Control) machine tool, and more particularly to a CNC dual-spindle transmission device.

DESCRIPTION OF THE PRIOR ART

Referring to FIG. 1, a C-shaped vertical machining center 10 disclosed in Taiwan Patent Application No. 099205341 is shown, which comprises a base 11, a saddle 12 mounted on the base 11, a work table 13 mounted on the saddle 12, a vertical column 14 erected upright and fixed at a rear side of the base 11, two spindle head slide seats 15 mounted to the vertical column 14, two servo driver units 16 mounted to the vertical column 14 to respectively drive the spindle head slide seats 15 to move up and down (dual Z-axes), and first and second spindles 17 respectively mounted to the spindle head slide seats 15. The work table 13 may receive a plurality of work pieces (not shown in the drawing) to position thereon. The first and second spindles 17 may be operated to simultaneously machine two work pieces. As such, doubled efficiency of machining operations can be achieved.

The C-shaped vertical machining center 10 described above, although helping improve machining efficiency, still suffers certain deficiencies. The conventional C-shaped vertical machining center 10 comprises two servo driver units 16 to respectively drive the spindle head slide seats 15 to move and each of the servo driver units 16 comprises various components, including two linear rails, a ball screw, four slide blocks, and a servo motor. Thus, the installation cost of the two servo driver units 16 is expensive. Further, since it is necessary to install two servo driver units 16, the vertical column 14 requires an extremely large space to arrange the linear rails of which the total number is four in a spaced manner. The size of the entire machine is expanded and the material cost is increased and a large surface area of a workshop may be occupied.

Referring to FIGS. 2 and 3, a dual Z axis function included, X-direction arranged dual-spindle C-shaped vertical machining center 20 is shown, which was proposed by the present inventor for the purpose of overcoming the deficiencies of the conventional C-shaped vertical machining center 10 and which is allocated with Utility Model No. M404747. The dual-spindle C-shaped vertical machining center 20 comprises a base 21, a saddle 22 that is mounted on the base 21 and in movable frontward and rearward, a work table 23 that is mounted on the saddle 22 and is movable leftward and rightward, a vertical column 24 that is fixed at the rear side of the base 21, a spindle head slide seat 25 that is mounted to the vertical column 24 and is movable up and down, a first Z-axis servo driver unit 26 that is mounted to the vertical column 24 to drive the entirety of the spindle head slide seats 25 to move up and down, a first spindle 27 that is mounted at a front end of the spindle head slide seat 25, a second spindle 28 that is mounted to the front end of the spindle head slide seats 25 and is movable up and down, and a second Z-axis servo driver unit 29 that is mounted to the spindle head slide seat 25 to drive the second spindle 28 to move up and down (see FIG. 3). The first spindle 27 and the second spindle 28 each have a lower end for gripping and holding a tool (not shown in the drawings). Tool corrections of the first spindle 27 and the second spindle 28 are respectively achieved with the first Z-axis servo driver unit 26 and the second Z-axis servo driver unit 29. The first spindle 27 and the second spindle 28 are arranged horizontally in the X-axis direction to be respectively located at the left and right sides.

The above dual-spindle C-shaped vertical machining center 20 uses a single spindle head slide seat 25 to drive both the first spindle 27 and the second spindle 28 to move up and down in the Z-axis direction. This is used in combination with the second spindle 28 that independently achieves correction with servo and up and down movement. As such, the area of the machine can be effectively reduced and costs are lowered down. Further, doubled efficiency of the machining time can be achieved also and machining can be done for both large and small work pieces.

However, the above dual-spindle C-shaped vertical machining center 20 still suffers the following drawbacks in the operation thereof. Since the first spindle 27 and the second spindle 28 are both mounted to the spindle head slide seat 25, the three of the first spindle 27, the second spindle 28, and the spindle head slide seats 25 are unitarily integrated together. In addition, the first Z-axis servo driver unit 26 that drives the second spindle 28 is also mounted to the spindle head slide seat 25. Thus, the total weight of the own weight of the spindle head slide seat 25 in combination with the weights of the two spindles 27, 28 and the second Z-axis servo driver unit 29 applies a large inertia weight to the spindle head slide seat 25 and this affects the movement of precision and acceleration of the first Z-axis servo driver unit 26 driving the spindle head slide seat 25. In addition, the first Z-axis servo driver unit 26 requires increased driving power. Further, the inclusion of the spindle head slide seat 25 having a large inertial weight also fast wears and damages the components of the first Z-axis servo driver unit 26.

Further, Japanese Patent Laid Open Publication No. 63-212448 discloses a dual-spindle vertical machining center, which has a different structural arrangement from the above described dual-spindle C-shaped vertical machining center 20 but has similarity, which is that a first Z-axis servo driver unit is used to drive a spindle head slide seat to move up and down and the spindle head slide seat comprises a first spindle, a second spindle that is movable up and down, and a second Z-axis servo driver unit that drives the second spindle to move up and down to mount thereon, so as to effectively reduce the machine size, save costs, and also achieve doubled efficiency of machining time and allows for machining performed on both large and small work pieces. Similarly, the same deficiency of having excessively large inertial weight as that of the previous spindle head slide seat exists.

Further, a CNC horizontal dual-spindle machining center also has the same deficiency as that of the C-shaped vertical machining center 10. Thus, referring to FIGS. 4 and 5, a CNC horizontal dual-spindle efficiency-doubled machine center 30 that was proposed by the present invention for overcoming the deficiency of the conventional CNC horizontal dual-spindle machining center and was allocated with Taiwan Utility Model No. M454899. The CNC horizontal dual-spindle efficiency-doubled machine center 30 comprises a chassis unit 31 and a machining head unit 32. The chassis unit 31 comprises a base 311, a vertical column 312 erected upright at a rear side of the base 311, and a work table 313 mounted in front of the base 311 and movable in a front-rear direction Y and a left-right direction X. The machining head unit 32 comprises a slide seat 321 movably mounted to the vertical column 312 and movable in an up-down direction Z, a first spindle 322 mounted to the slide seat 321 in the front-rear direction Y, a second spindle 323 movably mounted to the slide seat 321 in the front-rear direction Y and parallel with and side-by-side adjacent to the first spindle 322, and a driver component 324 fixedly mounted to the slide seat 321 to drive the second spindle 323 to move in the front-rear direction Y. By arranging both the first spindle 322 and the second spindle 323 on the slide seat 321, the machine size can be effectively reduced and the costs can be saved and doubled efficiency of machining time and applications to machining both large and small work pieces can be achieved. The slide seat 321 of the above CNC horizontal dual-spindle efficiency-doubled machine center 30 also carries both the first and second spindles 322, 323 and the driver component 324, so as to have the drawbacks caused by an excessively large inertia weight.

SUMMARY OF THE INVENTION

Thus, an object of the present invention is to provide a computer numerical control (CNC) dual-spindle transmission device that helps reduce the size of a machine and improves machining performance.

The present invention provides a CNC dual-spindle transmission device, which is installed on a CNC dual-spindle machining center in such a way that a first spindle and a second spindle of the CNC dual-spindle machining center are mounted thereto, the CNC dual-spindle machining center further comprising a base, a machining table movably mounted on the base, and a vertical column erected upright in an up-down direction at a rear portion of the base. The CNC dual-spindle transmission device comprises: a linear rail assembly, a first slide seat, a second slide seat, a first power unit, and a second power unit.

The linear rail assembly is mounted to the vertical column and comprises two linear rails that extend in the up-down direction and are spaced from each other in a left-right direction. The first slide seat is slidably mounted to the linear rail assembly to receive the first spindle to mount thereto and comprises a first right slide block assembly and a first left slide block assembly respectively in slidable engagement with the linear rails and each comprising a plurality of first slide blocks. The second slide seat extends in the left-right direction across the first slide seat and is slidably mounted to the linear rail assembly in a manner of being spaced from the first slide seat to receive the second spindle to mount thereto and comprises a second right slide block assembly and a second left slide block assembly respectively in slidable engagement with the linear rails and each comprising a plurality of second slide blocks. The first power unit is mounted to the vertical column to drive the first slide seat to move in the up-down direction. The second power unit is mounted to the vertical column to drive the second slide seat to move in the up-down direction. The first and second right slide block assemblies are set in slidable engagement with one of the linear rails and the first and second left slide block assemblies are set in slidable engagement with the other one of the linear rails. A spacing distance between the first slide blocks is different from a spacing distance between the second slide blocks that are in slidable engagement with the same one of the linear rails and the first and second slide blocks are alternate with each other in the up-down direction.

The efficacy of the present invention is that the second slide seat extends in the left-right direction across the first slide seat and is, together with but spaced from the first slide seat, slidably mounted to the linear rails so as to respectively receive the first and second spindles to mount thereto and also be respectively driven by the first and second power units to move in the up-down direction, whereby the linear rails used can be of a number that is minimum but still enable the slidable arrangement of two slide seats in a manner of being independently drivable for sliding motion so that the size of the machine can be effectively reduced to save cost and also, doubling of efficiency of the machining time and machining of both large and small work pieces can be achieved. Further, the two independently drivable slide seats respectively carry the weights of the first and second spindles only, so that compared to the conventional spindle head, the slide seats each only need to support roughly one half of the load weight carried thereon and one half of the weight of the seats. This also overcomes the drawback of the conventional dual-spindle C-shaped vertical machining center that the two spindles are both mounted on a spindle head slide seat and are thus unitarily combined with the spindle head slide seat so that when the spindle head slide seat drives the two spindles to move in up-down direction, the unitary combination of the three results in an issue of excessive inertia weight.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
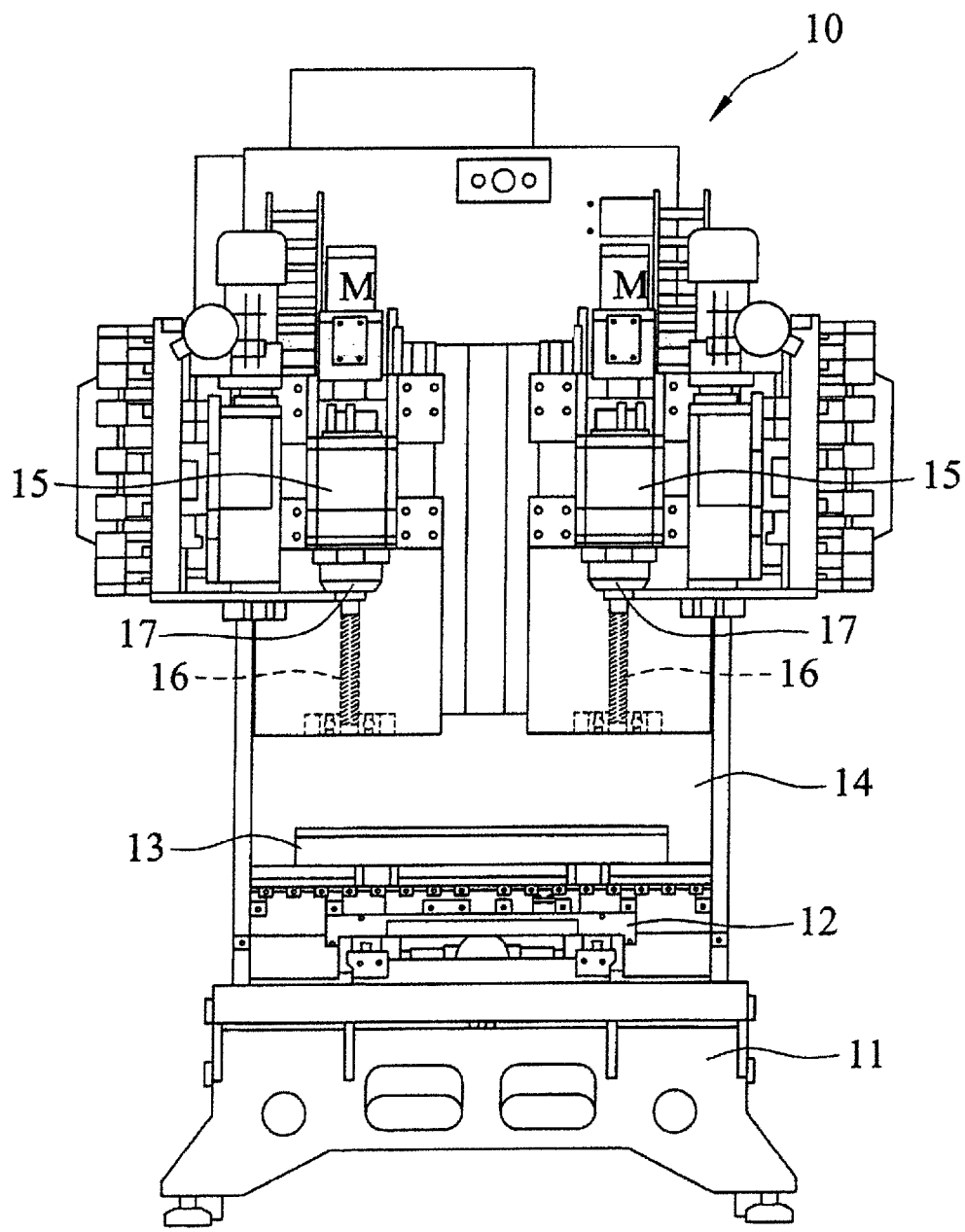
FIG. 1 is a front view of a conventional C-shaped vertical machining center.
Figure 2:
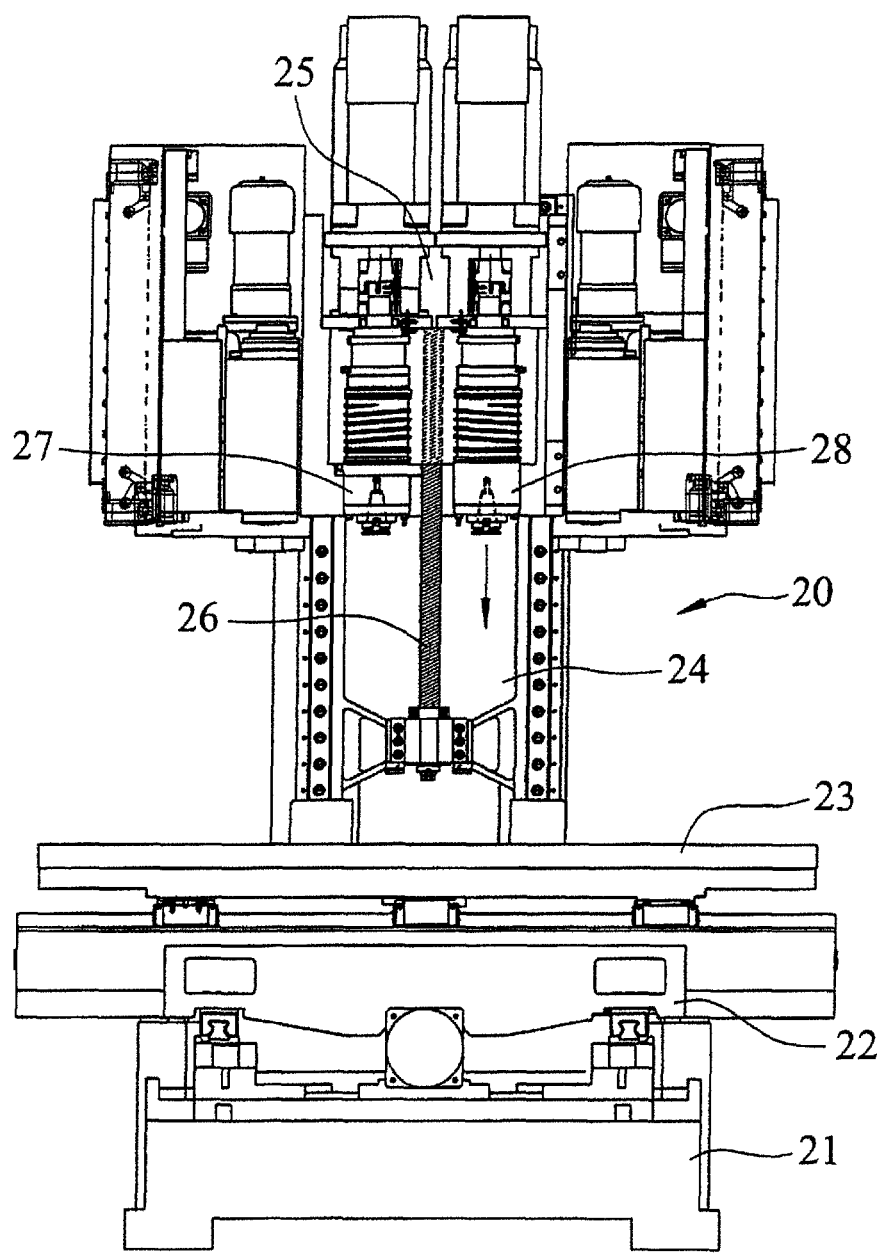
FIG. 2 is a front view showing a conventional dual Z axis function included X-direction arranged dual-spindle C-shaped vertical machining center.
Figure 3:
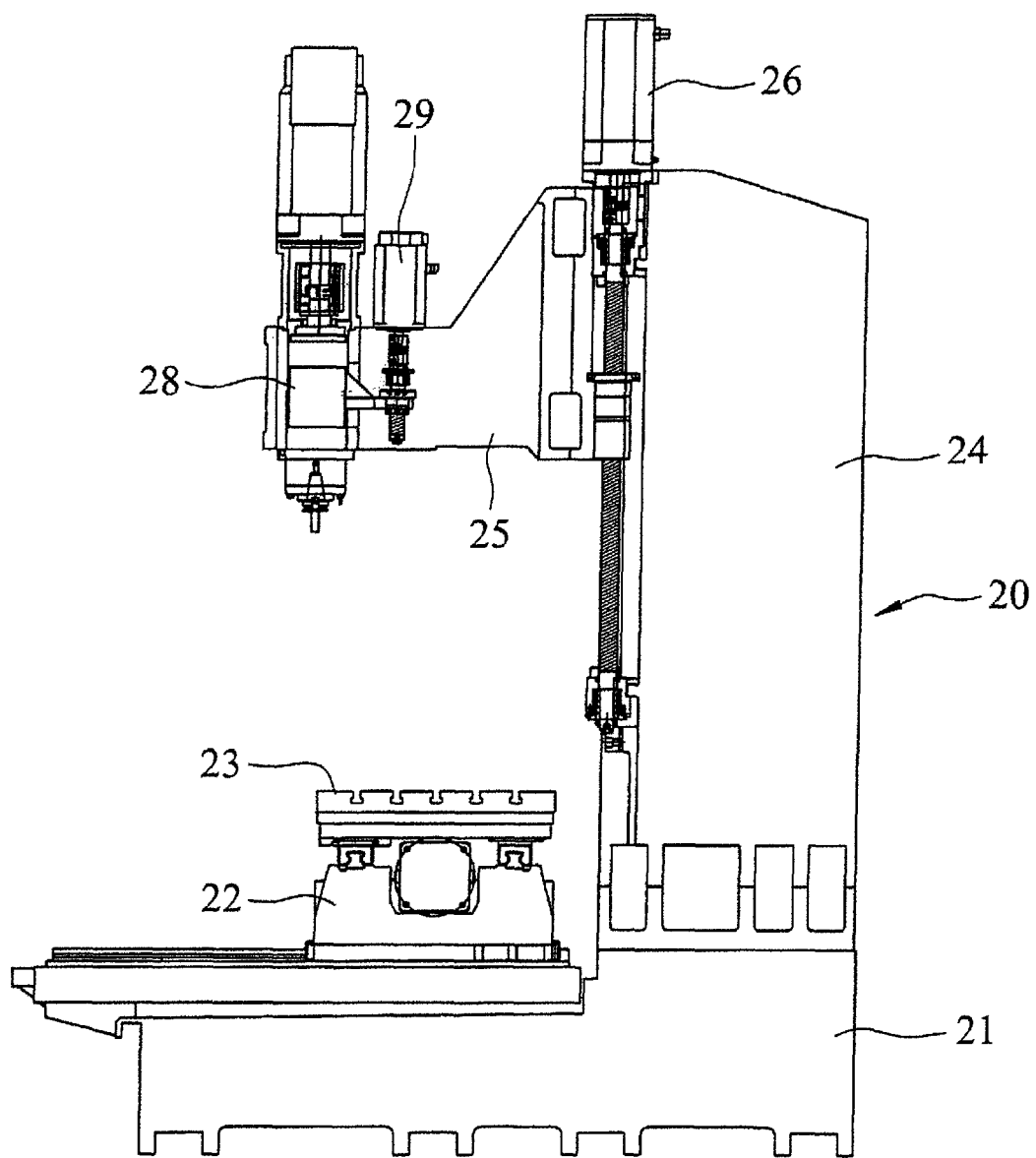
FIG. 3 is a side elevational view showing the conventional dual Z axis function included X-direction arranged dual-spindle C-shaped vertical machining center.
Figure 4:
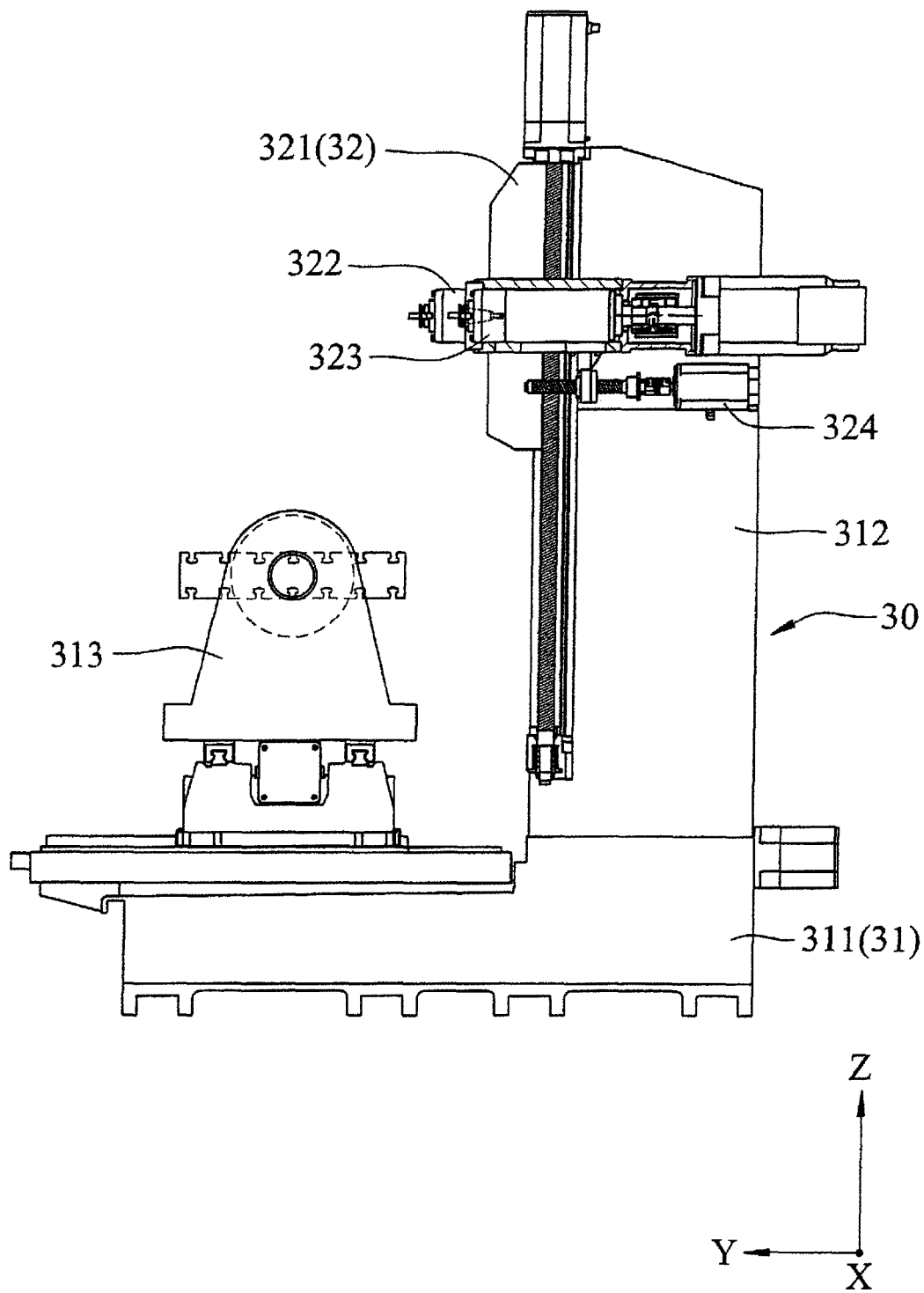
FIG. 4 is a side elevational view of a conventional CNC horizontal dual-spindle efficiency-doubled machine center.
Figure 5:
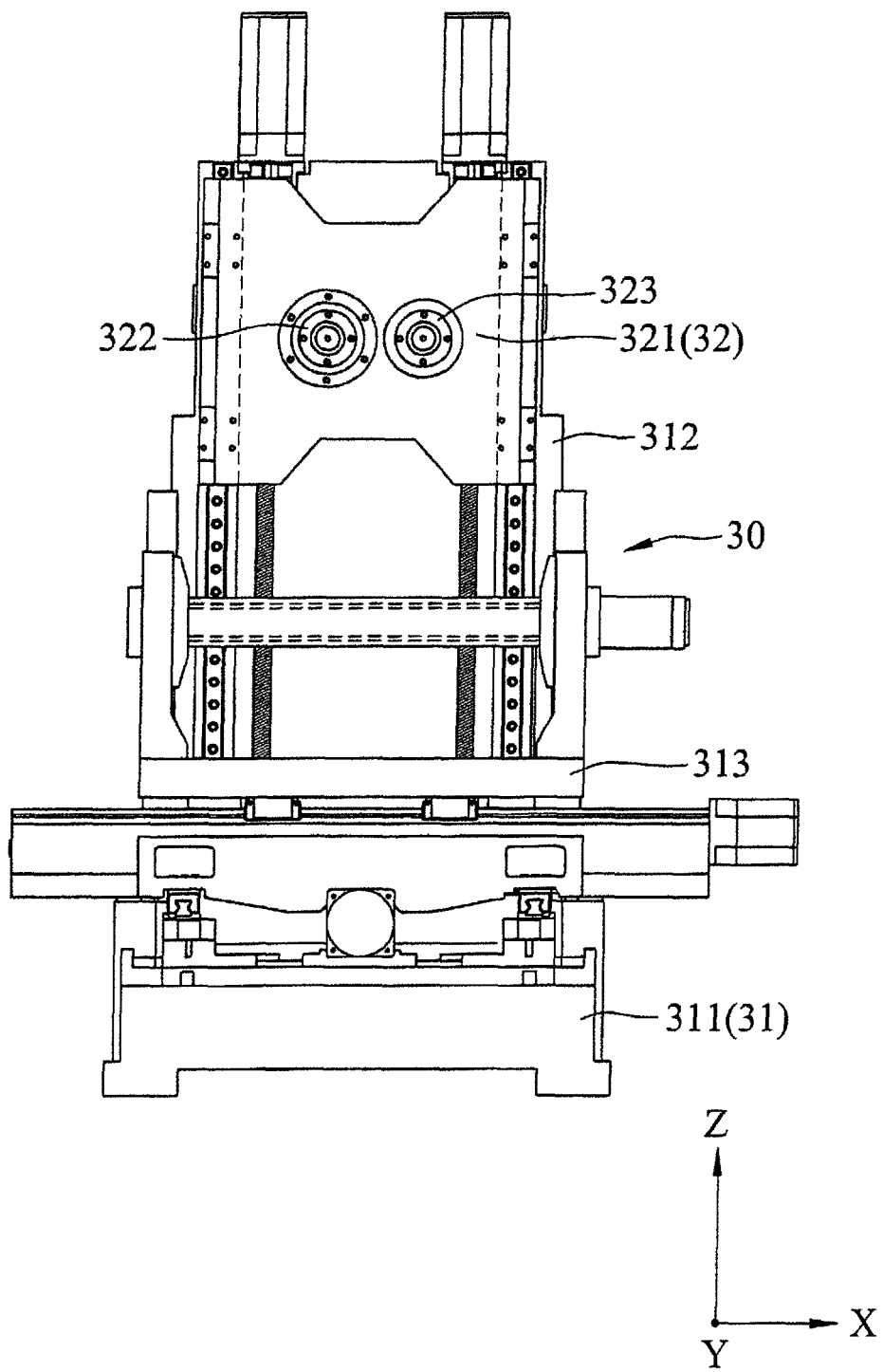
FIG. 5 is a front view of the conventional CNC horizontal dual-spindle efficiency-doubled machine center.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Before a description is given to the present invention, it is first noted that throughout the entire disclosure, the position related terminology used herein, such as the left-right direction X, the front-rear direction Y, and the vertical direction Z, is taken with reference to the orientation of the drawing sheets and the left-right direction X, the front-rear direction Y, and the vertical direction Z are perpendicular to each other.

Figure 6:
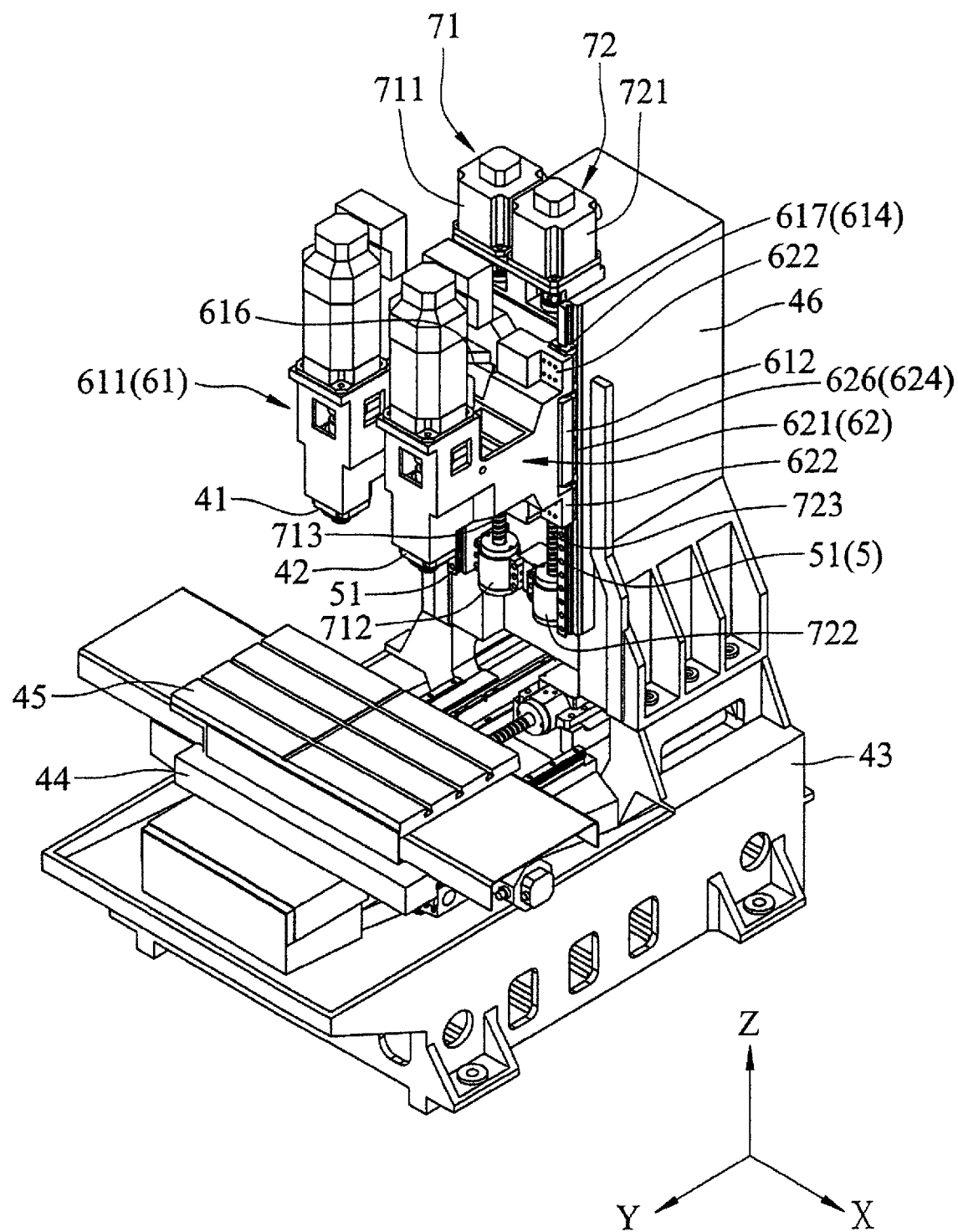
FIG. 6 is a perspective view showing a CNC dual-spindle transmission device according to a first embodiment of the present invention installed on a CNC dual-spindle vertical machining center.
Figure 7:
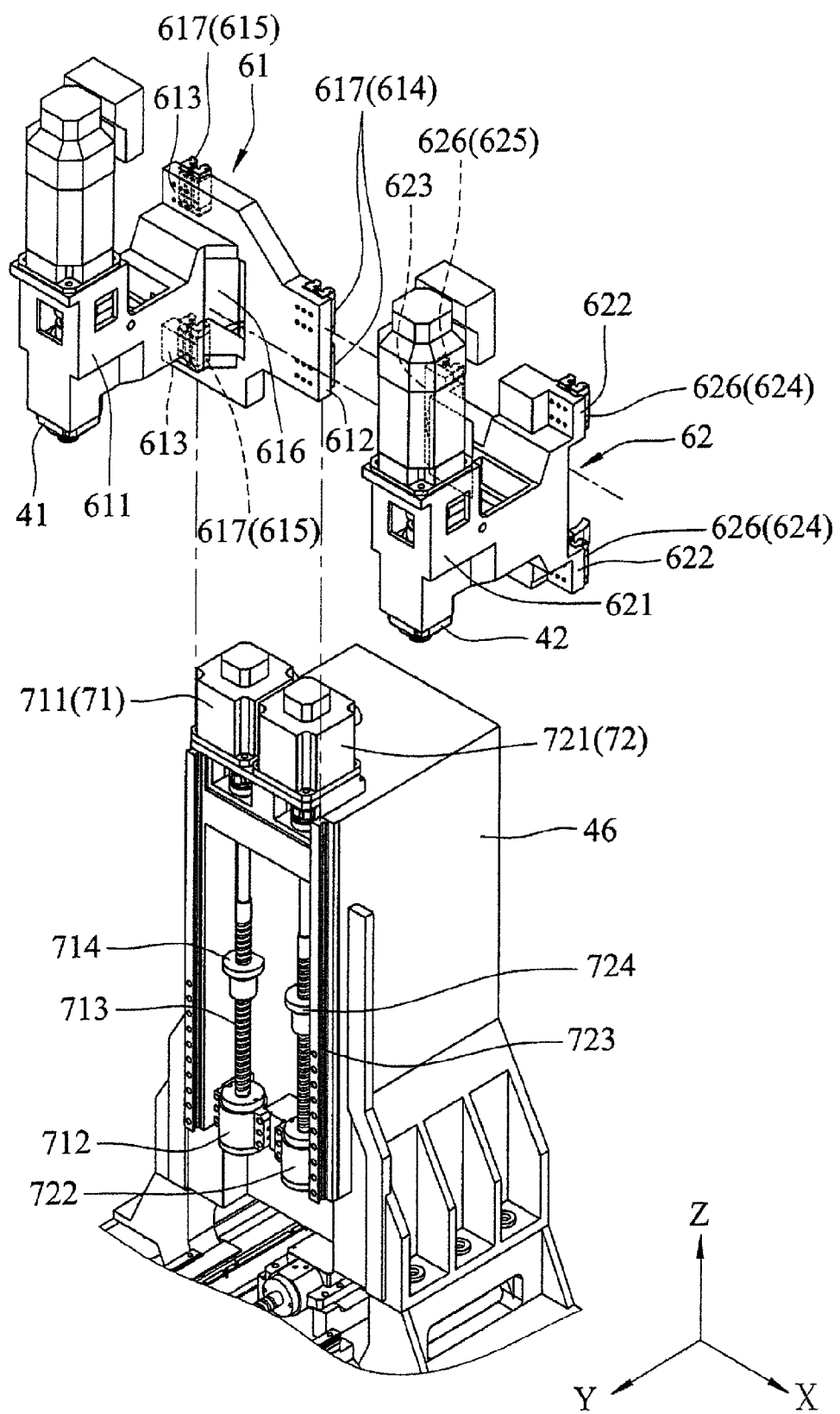
FIG. 7 is a partial exploded view showing spatial relationships among a linear rail assembly, first and second slide seats, and first and second power units of the first embodiment and first and second spindles of the CNC dual-spindle vertical machining center.
Figure 8:
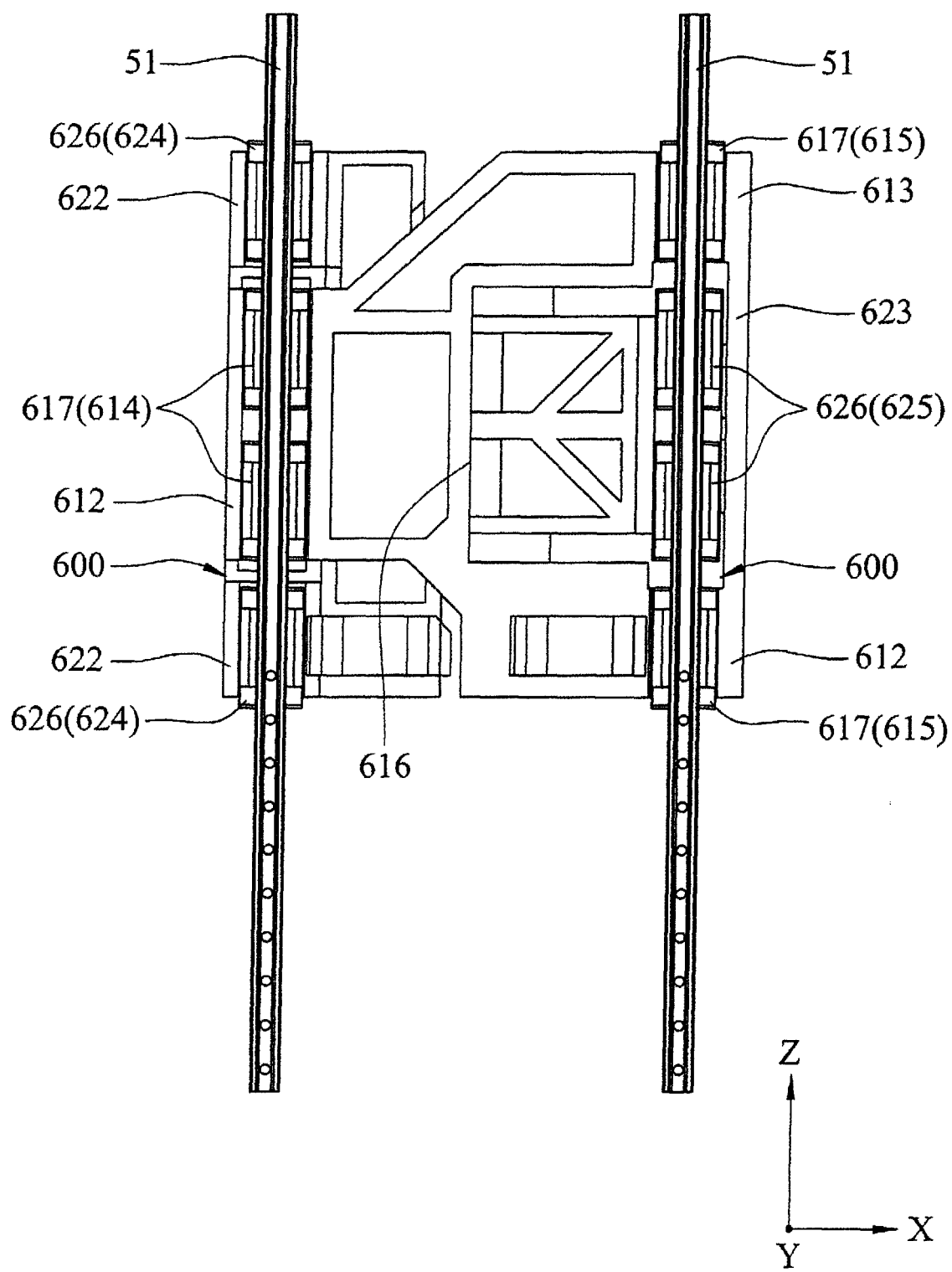
FIG. 8 is a schematic view showing the spatial relationships between the first and second slide seats and the linear rail assembly of the first embodiment.

Referring to FIGS. 6, 7, and 8, a computer numerical control (CNC) dual-spindle transmission device according to a first embodiment of the present invention is installable in a CNC dual-spindle vertical machining center in such a way that a first spindle 41 and a second spindle 42 of the CNC dual-spindle vertical machining center are mounted thereto in a manner of being erected upright in an up-down direction Z. The CNC dual-spindle vertical machining center further comprises a base 43, a saddle 44, a machining table 45, and a vertical column 46. The saddle 44 is mounted on the base 43 in a manner of being reciprocally movable in a front-rear direction Y. The machining table 45 is mounted on the saddle 44 in a manner of being reciprocally movable in a left-right direction X. The vertical column 46 is erected upright in the up-down direction Z at a rear portion of the base 43. The first spindle 41 and the second spindle 42 both have a lower end for gripping and holding a tool (not shown) and both are movable in the up-down direction Z to perform machining operations on work pieces.

The CNC dual-spindle transmission device comprises a linear rail assembly 5, a first slide seat 61, a second slide seat 62, a first power unit 71, and a second power unit 72.

The linear rail assembly 5 is mounted to the vertical column 46 and comprises two linear rails 51 that extend in the up-down direction Z and are spaced from each other in the left-right direction X.

The first slide seat 61 is integrally formed in a unitary form and is slidably mounted on the linear rail assembly 5 and comprises a first seat body 611, a first right fixing section 612, two first left fixing sections 613, a first right slide block assembly 614, a first left slide block assembly 615 and a through hole 616. The first seat body 611 receives the first spindle 41 to mount thereto. The first right fixing section 612 extends outward from the first seat body 611 to a location frontward of one of the linear rails 51 that is located at the right side. The first left fixing sections 613 extend outward from the first seat body 611 to locations frontward of the other one of the linear rails 51 that is located at the left side and are spaced from each other in the up-down direction Z. The first right slide block assembly 614 are fixedly mounted to the first right fixing section 612 and comprises two first slide blocks 617 that are slidably mounted to the corresponding one of the linear rails 51. The first left slide block assembly 615 comprises two first slide blocks 617 that are respectively and fixedly mounted to the first left fixing sections 613 and are respectively and slidably mounted to the corresponding one of the linear rails 51. The through hole 616 extends in the left-right direction X through the first seat body 611 and is located between the first left fixing sections 613.

The second slide seat 62 is integrally formed in a unitary form and extends in the left-right direction X across the first slide seat 61 to be slidably mounted to the linear rail assembly 5 in a manner of being spaced from the first slide seat 61. The second slide seat 62 comprises a second seat body 621, two second right fixing sections 622, a second left fixing section 623, a second right slide block assembly 624, and a second left slide block assembly 625. The second seat body 621 receives the second spindle 42 to mount thereto and is spaced from the first seat body 611 in the left-right direction X. The second right fixing sections 622 extend outward from the second seat body 621 to locations frontward of the one of the linear rails 51 that is located at the right side and are spaced from each other in the up-down direction Z. The second left fixing section 623 extends outward from the second seat body 621 to extend through the through hole 616 of the first slide seat 61 to a location frontward of the other one of the linear rails 51 that is located at the left side. The second right slide block assembly 624 comprises two second slide blocks 626 that are respectively and fixedly mounted to the second right fixing sections 622 and are slidably mounted to a corresponding one of the linear rails 51. The second left slide block assembly 625 is fixedly mounted to the second left fixing section 623 and comprises two second slide blocks 626 slidably mounted to a corresponding one of the linear rails 51. However, referring to FIG. 8, a correction gap 600 is present between the first and second right fixing sections 612, 622 that are adjacent to each other and located frontward of the same one of the linear rails 51 and also between the first and second left fixing sections 613, 623 that are adjacent to each other and located frontward of the same one of the linear rails 51. For those in slidable engagement with the same one of the linear rails 51, the first slide blocks 617 have a spacing distance therebetween that is different from a spacing distance between the second slide blocks 626 and the first and second slide blocks 617, 626 are alternate with each other in the up-down direction Z. In the instant embodiment, the first slide blocks 617 that slidably engage the right-side linear rail 51 are located between the second slide blocks 626; and the second slide blocks 626 that slidably engage the left-side linear rail 51 are located between the first slide blocks 617.

The first power unit 71 is mounted on the vertical column 46 and drives the first slide seat 61 to move in the up-down direction Z and comprises a first servo motor 711 and a first bearing seat 712 that are spaced from each other, a first screw 713 that is coupled between the first servo motor 711 and the first bearing seat 712 and is driven by the first servo motor 711, and a first nut 714 that couples the first screw 713 to the first seat body 611.

The second power unit 72 is mounted on the vertical column 46 and drives the second slide seat 42 to move in the up-down direction Z and comprises a second servo motor 721 and a second bearing seat 722 that are spaced from each other, a second screw 723 that is coupled between the second servo motor 721 and the second bearing seat 722 and is driven by the second servo motor 721, and a second nut 724 that couples the second screw 723 to the second seat body 621.

Figure 9:
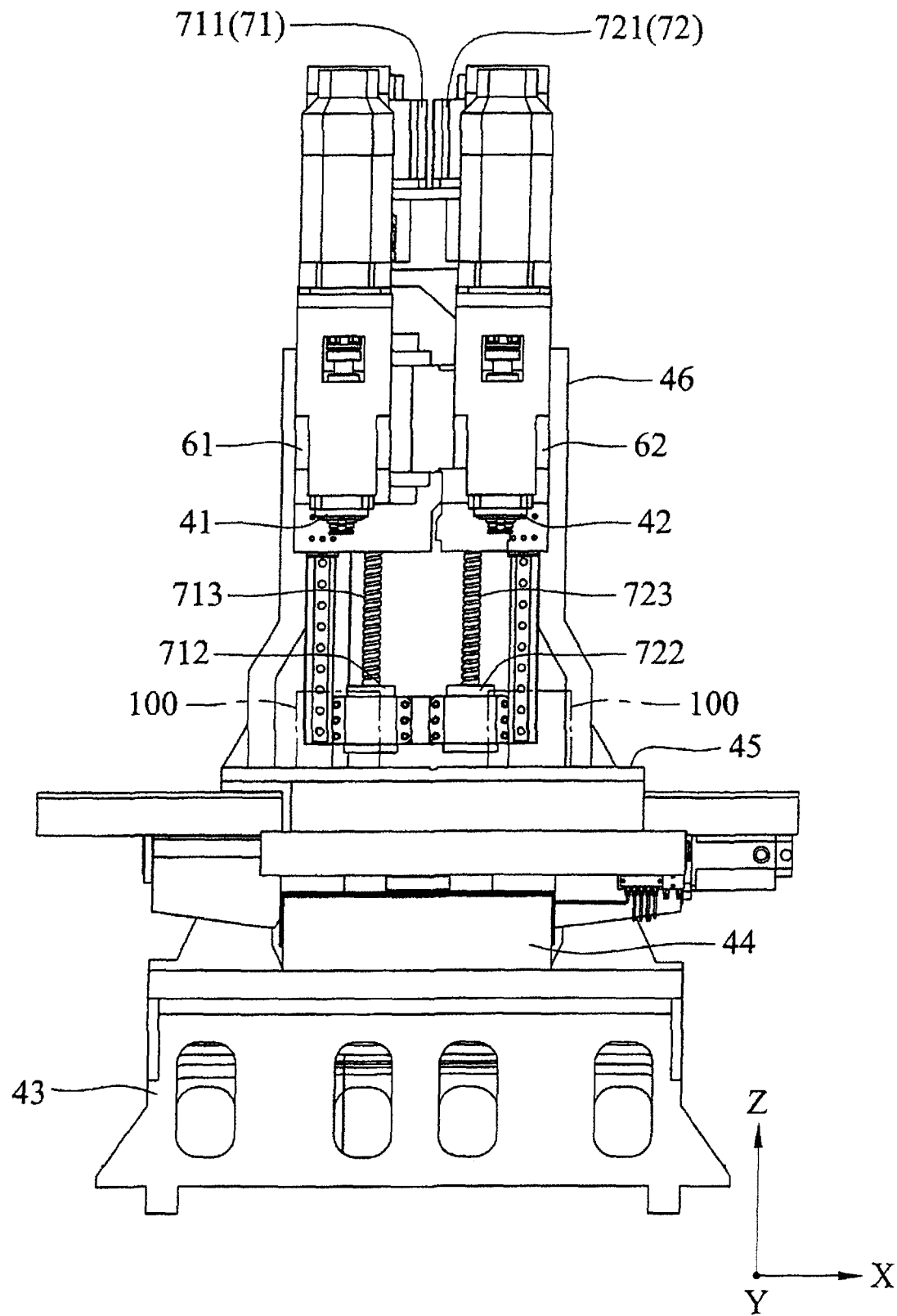
FIG. 9 is a front view illustrating the first embodiment driving the first and second spindles to conduct machining operations on a plurality of small work pieces.

The structure of the CNC dual-spindle transmission device according to the first embodiment of the present invention has been described above. The operation and performance of the first embodiment of the present invention will be described as follows:

Referring to FIGS. 6 and 9, when a user attempts to machine a plurality of small work pieces 100, the small work pieces 100 are positioned on the machining table 45 and the first power unit 71 and the second power unit 72 are put into operation to have both the first spindle 41 and the second spindle 42 lowered down to the same machining altitude so that the first spindle 41 and the second spindle 42 may simultaneously perform machining operations on the small work pieces 100. As such, a performance that the machining time achieves doubled efficiency is provided.

Figure 10:
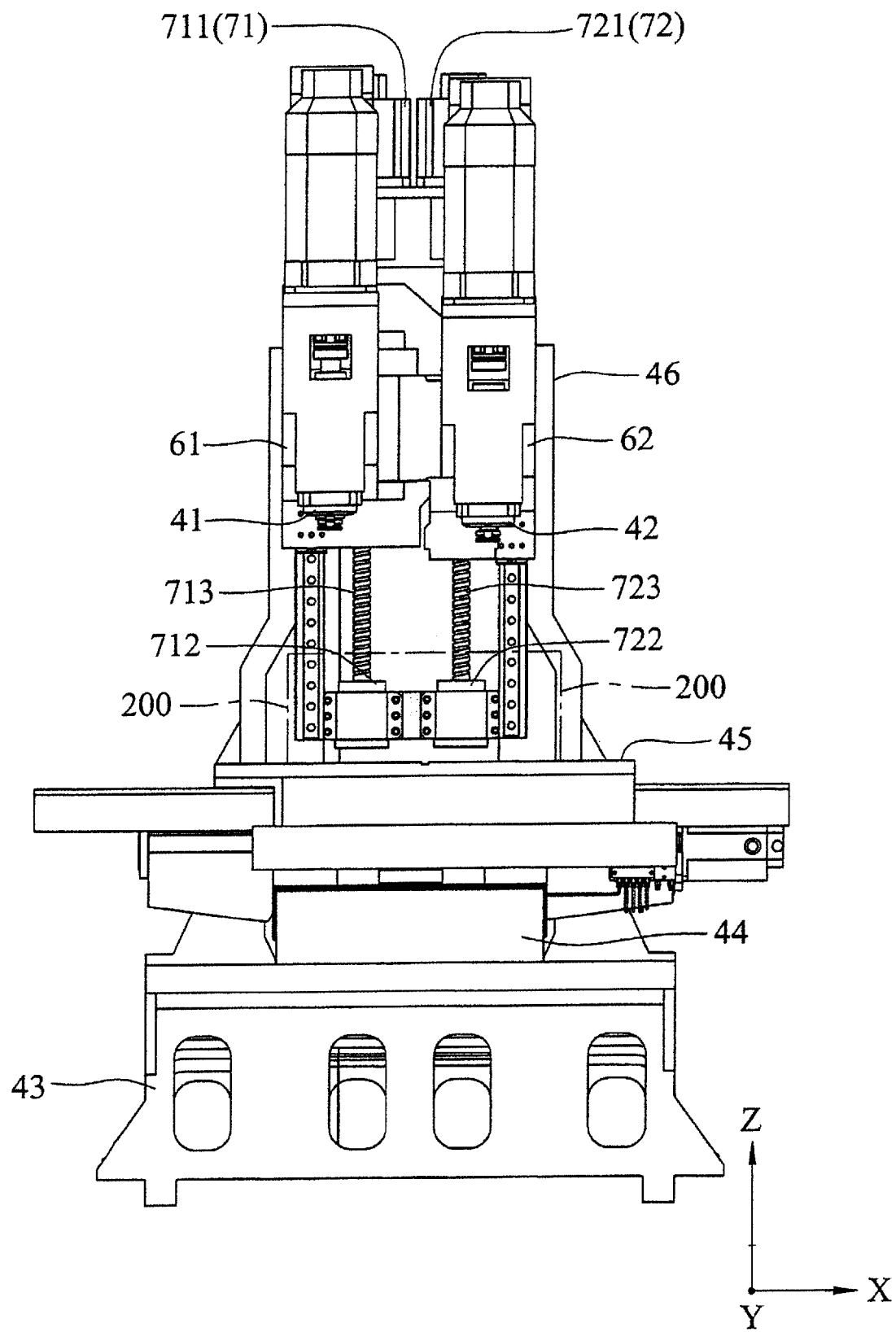
FIG. 10 is a front view illustrating the first embodiment driving the first and second spindles to conduct machining operations on a large work piece.

Referring to FIGS. 6 and 10, when the user attempts to machine a large work piece 200, to prevent interference of the second spindle 42 with the large work piece 200, since the adjacent first and second right fixing sections 612, 622 and the adjacent first and second left fixing sections 613, 623 both have a correction gap 600 present therebetween, the user may control and drive the second slide seat 62 to move relative to the first slide seat 61 so as to raise the second spindle 42 upward, allowing the first spindle 41 to individually perform various machining operations on the large work piece 200.

It is appreciated from the above description that the CNC dual-spindle transmission device according to the first embodiment of the present invention is arranged in such a way that the second slide seat 62 extends in the left-right direction X across the first slide seat 61 and is, together with but spaced from the first slide seat 61, slidably mounted to the linear rails 51 so as to respectively receive the first and second spindles 41, 42 to mount thereto and also be respectively driven by the first and second power units 71, 72 to move in the up-down direction Z, whereby the linear rails 51 used can be of a number that is minimum but still enable the slidable arrangement of two slide seats 61, 62 in a manner of being independently drivable for sliding motion so that the size of the machine can be effectively reduced to save cost and also, doubling of efficiency of the machining time and machining of both large and small work pieces can be achieved. Further, the two independently drivable slide seats 61, 62 respectively carry the weights of the first and second spindles 41, 42 only, so that compared to the conventional spindle head, the slide seats 61, 62 each only need to support roughly one half of the load weight carried thereon and one half of the weight of the seats. This also overcomes the drawback of the conventional dual-spindle C-shaped vertical machining center that the two spindles are both mounted on a spindle head slide seat and are thus unitarily combined with the spindle head slide seat so that when the spindle head slide seat drives the two spindles to move in up-down direction, the unitary combination of the three results in an issue of excessive inertia weight.

Figure 11:
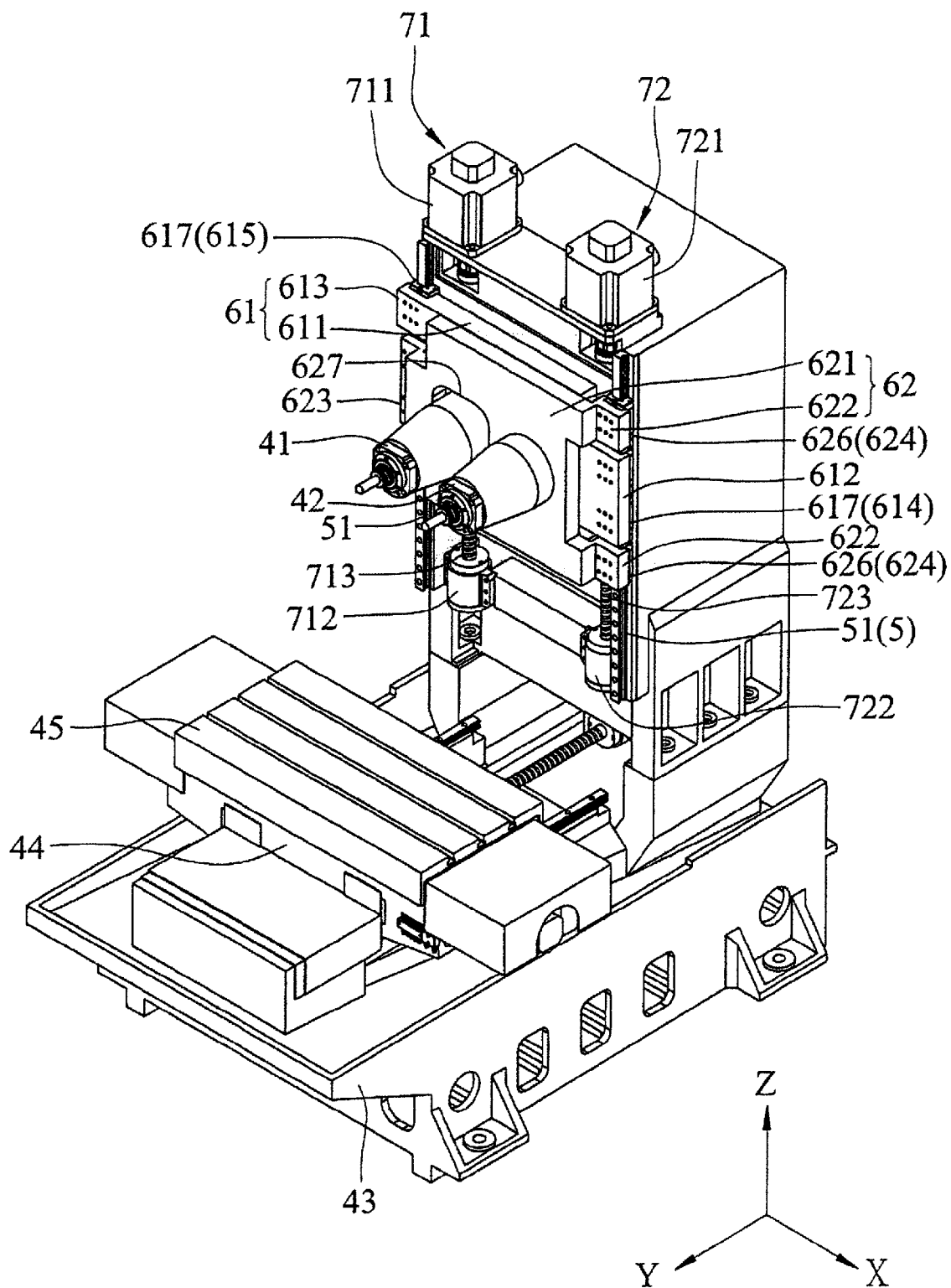
FIG. 11 is a perspective view showing a CNC dual-spindle transmission device according to a second embodiment of the present invention installed on a CNC dual-spindle horizontal machining center.
Figure 12:
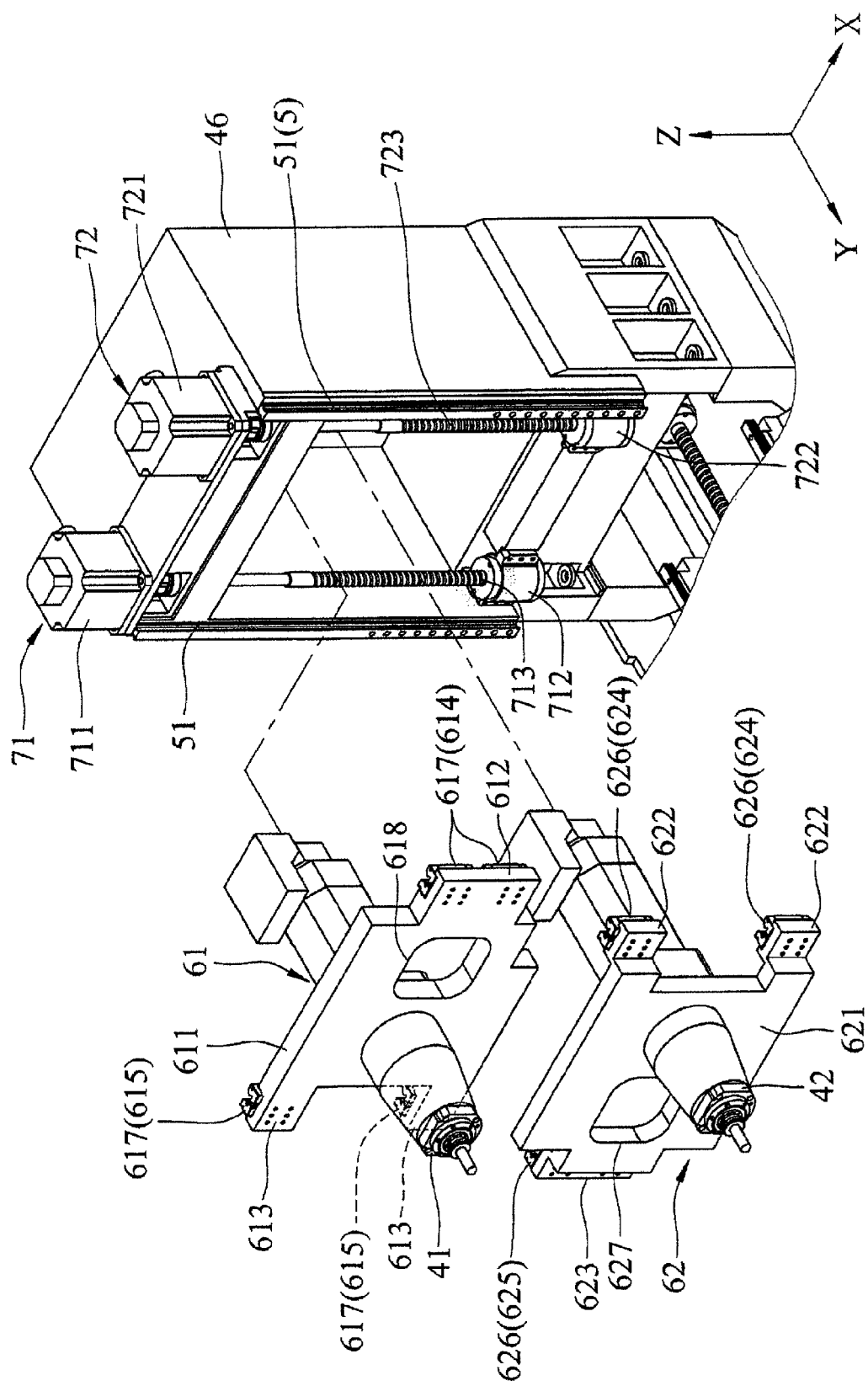
FIG. 12 is a partial exploded view showing spatial relationships among a linear rail assembly, first and second slide seats, and first and second power units of the second embodiment and first and second spindles of the CNC dual-spindle horizontal machining center.
Figure 13:
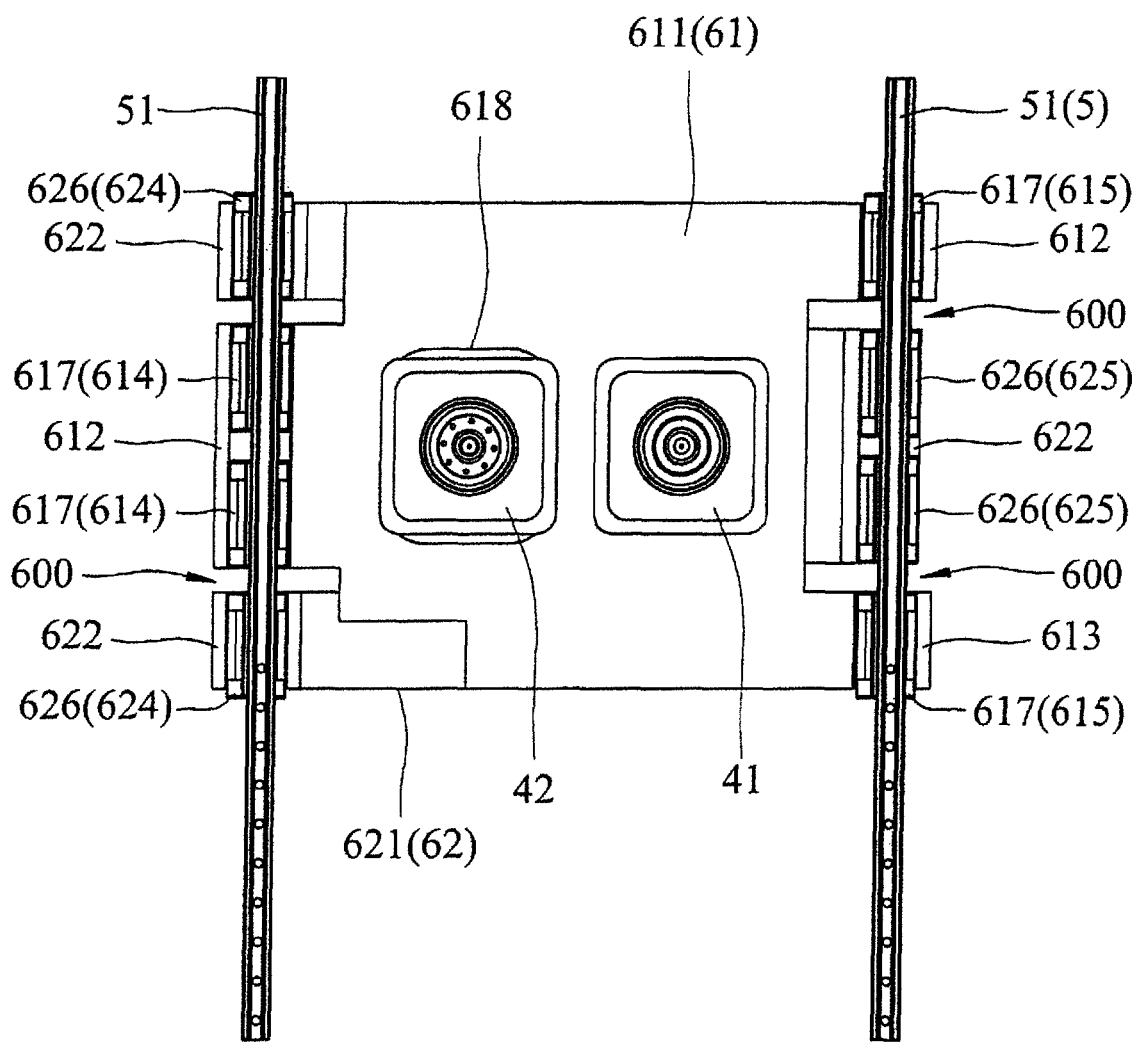
FIG. 13 is a schematic view showing the spatial relationships between the first and second slide seats and the linear rail assembly of the first embodiment.

Referring to FIGS. 11, 12, and 13, a CNC dual-spindle transmission device according to a second embodiment of the present invention is installable on a CNC dual-spindle horizontal machining center in such a way that a first spindle 41 and a second spindle 42 of the CNC dual-spindle horizontal machining center are mounted thereto to be arranged in a front-rear direction Y. The CNC dual-spindle horizontal machining center further comprises a base 43, a saddle 44, a machining table 45, and a vertical column 46. The saddle 44 is mounted on the base 43 in a manner of being reciprocally movable in a front-rear direction Y. The machining table 45 is mounted on the saddle 44 in a manner of being reciprocally movable in a left-right direction X. The vertical column 46 is erected upright in the up-down direction Z at a rear portion of the base 43. The first spindle 41 and the second spindle 42 both have a front end for gripping and holding a tool (not shown) and both are movable in the front-rear direction Y to perform machining operations on work pieces.

The second embodiment is substantially similar to the first embodiment and differences therebetween are as follows:

The first slide seat 61 omits the through hole 6160. The first seat body 611 and the second seat body 621 are arranged to space from each other in the front-rear direction Y. The first slide seat 61 further comprises an extend-through hole 618 that is formed in and extending in the front-rear direction Y through the first seat body 611. The second slide seat 62 further comprises an extend-through hole 627 that is formed in and extends in the front-rear direction Y through the second seat body 621. To assemble, the first spindle 41 is put, in the front-rear direction Y, through the extend-through hole 627 of the second slide seat 62 to be mounted to the first seat body 611; and the second spindle 42 is put, in the front-rear direction Y, through the extend-through hole 618 of the first slide seat 61 to be mounted to the second seat body 621. The extend-through holes 618, 627 that receive extensions of the first and second spindles 41, 42 therethrough are structured to provide additional spaces for the first and second spindles 41, 42 to move in the up-down direction Z.

However, referring to FIG. 13, in the second embodiment, the first and second slide seats 61, 62 are slidably mounted to the linear rails 51 in the same way as that of the first embodiment. In other words, a correction gap 600 is present between the first and second right fixing sections 612, 622 that are adjacent to each other and located frontward of the same one of the linear rails 51 and also between the first and second left fixing sections 613, 623 that are adjacent to each other and located frontward of the same one of the linear rails 51. For those in slidable engagement with the same one of the linear rails 51, the first slide blocks 617 have a spacing distance therebetween that is different from a spacing distance between the second slide blocks 626 and the first and second slide blocks 617, 626 are alternate with each other in the up-down direction Z. In the instant embodiment, the first slide blocks 617 that slidably engage the right-side linear rail 51 are located between the second slide blocks 626; and the second slide blocks 626 that slidably engage the left-side linear rail 51 are located between the first slide blocks 617.

Figure 14:
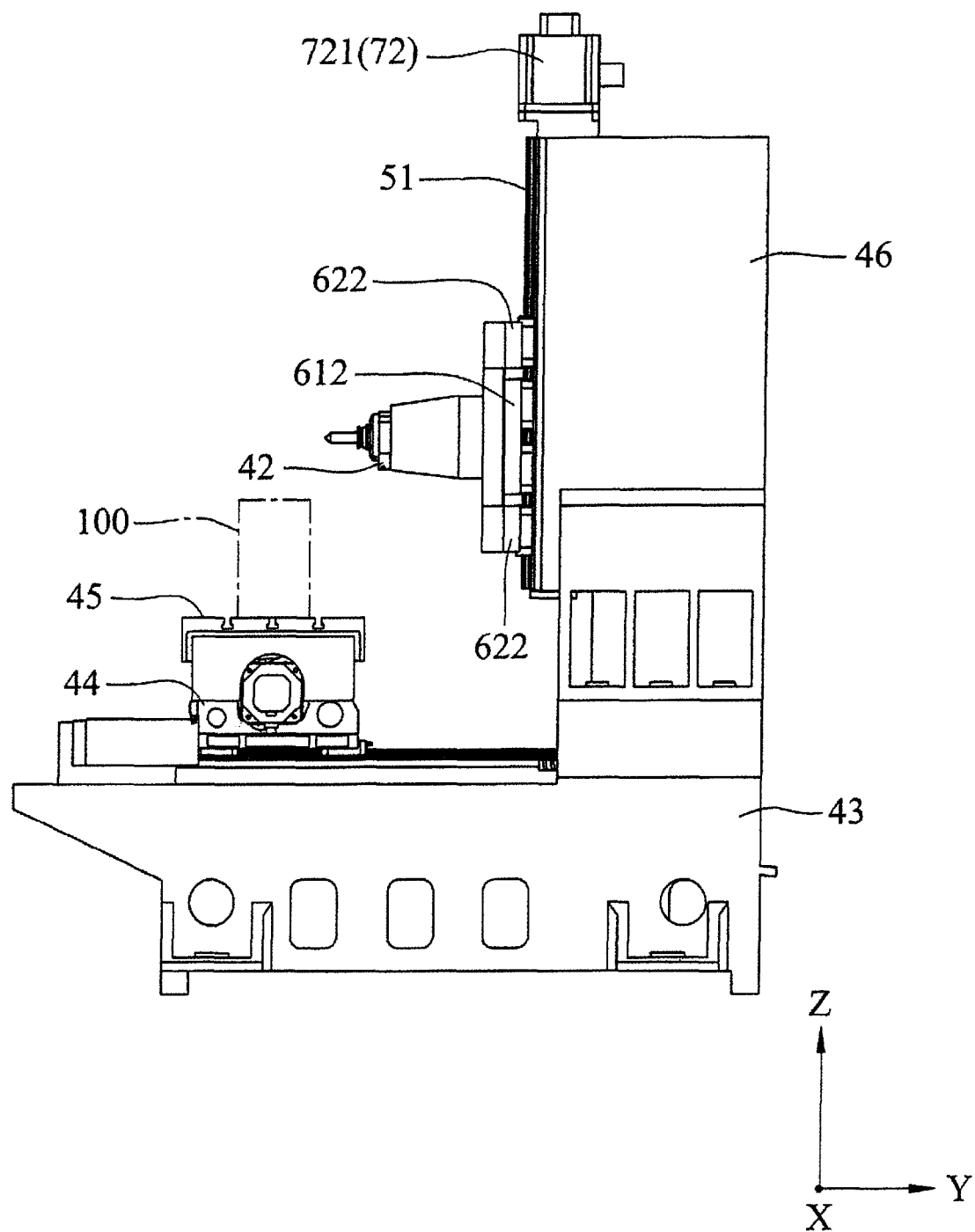
FIG. 14 is a front view illustrating the first embodiment driving the first and second spindles to conduct machining operations on a large work piece.

The structure of the CNC dual-spindle transmission device according to the second embodiment of the present invention has been described above. The operation and performance of the second embodiment of the present invention will be described as follows:

Referring to FIGS. 11 and 14, when a user attempts to machine a plurality of small work pieces 100, the small work pieces 100 are positioned on the machining table 45 and the first power unit 71 and the second power unit 72 are put into operation to have both the first spindle 41 and the second spindle 42 lowered down to the same machining altitude so that the first spindle 41 and the second spindle 42 may simultaneously perform machining operations on the small work pieces 100. As such, a performance that the machining time achieves doubled efficiency is provided.

Figure 15:
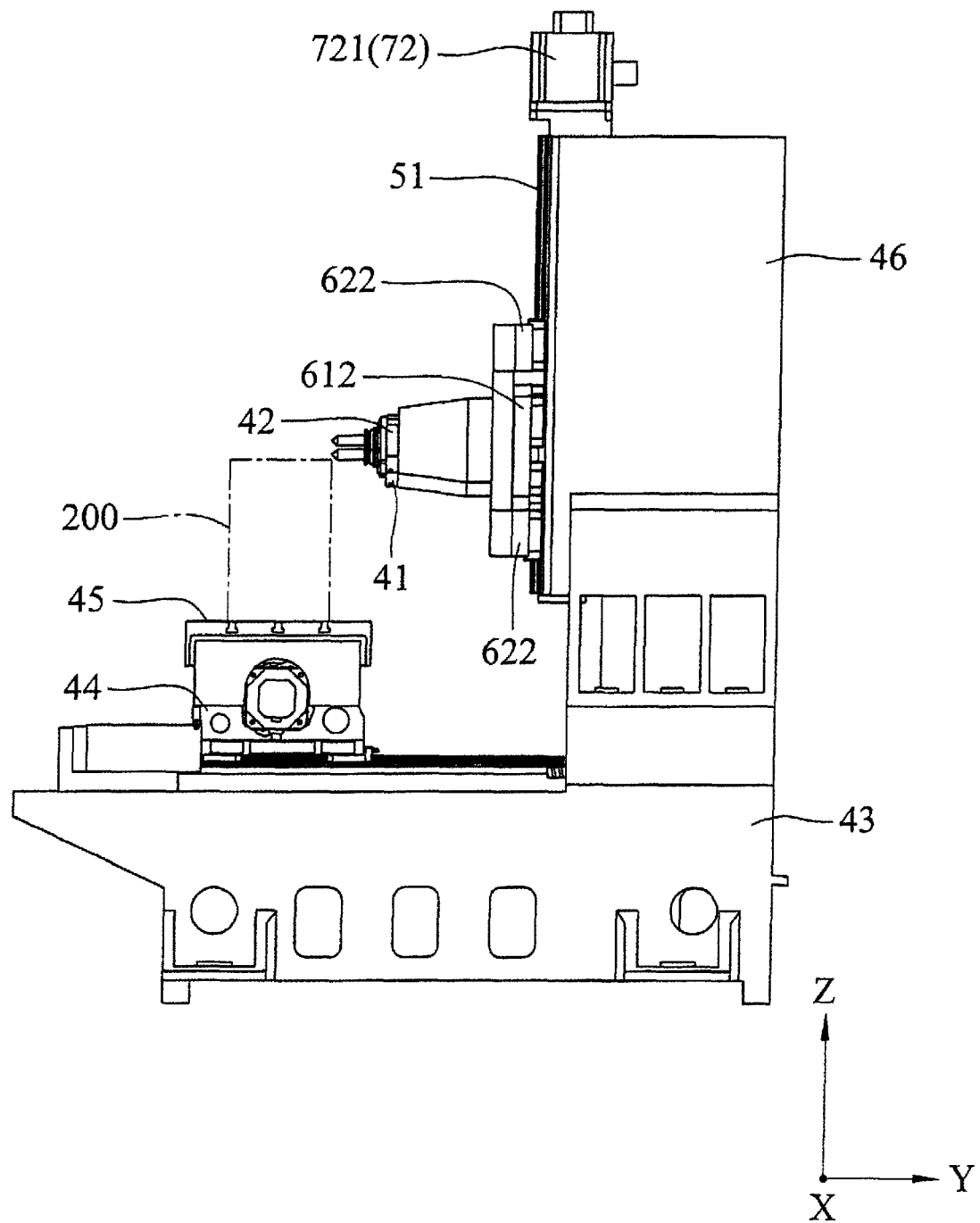
FIG. 15 is a front view illustrating the first embodiment driving the first and second spindles to conduct machining operations on a large work piece.

Referring to FIGS. 11 and 15, when the user attempts to machine a large work piece 200, to prevent interference of the second spindle 42 with the large work piece 200, since the adjacent first and second right fixing sections 612, 622 and the adjacent first and second left fixing sections 613, 623 both have a correction gap 600 present therebetween, the user may control and drive the second slide seat 62 to move relative to the first slide seat 61 so as to raise the second spindle 42 upward, allowing the first spindle 41 to individually perform various machining operations on the large work piece 200.

It is appreciated from the above description that the CNC dual-spindle transmission device according to the first embodiment may achieve the same effectiveness and advantages as those of the second embodiment.

In summary, the CNC dual-spindle transmission device according to the present invention is arranged in such a way that the second slide seat 62 extends in the left-right direction X across the first slide seat 61 and is, together with but spaced from the first slide seat 61, slidably mounted to the linear rails 51 so as to respectively receive the first and second spindles 41, 42 to mount thereto and also be respectively driven by the first and second power units 71, 72 to move in the up-down direction Z, whereby the linear rails 51 used can be of a number that is minimum but still enable the slidable arrangement of two slide seats 61, 62 in a manner of being independently drivable for sliding motion so that the size of the machine can be effectively reduced to save cost and also, doubling of efficiency of the machining time and machining of both large and small work pieces can be achieved. Further, the two independently drivable slide seats 61, 62 respectively carry the weights of the first and second spindles 41, 42 only, so that compared to the conventional spindle head, the slide seats 61, 62 each only need to support roughly one half of the load weight carried thereon and one half of the weight of the seats. This also overcomes the drawback of the conventional dual-spindle C-shaped vertical machining center that the two spindles are both mounted on a spindle head slide seat and are thus unitarily combined with the spindle head slide seat so that when the spindle head slide seat drives the two spindles to move in up-down direction, the unitary combination of the three results in an issue of excessive inertia weight.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A computer numerical control (CNC) dual-spindle transmission device, which is installed on a CNC dual-spindle machining center in such a way that a first spindle and a second spindle of the CNC dual-spindle machining center are mounted thereto, the CNC dual-spindle machining center further comprising a base, a machining table movably mounted on the base, and a vertical column erected upright in an up-down direction at a rear portion of the base, the CNC dual-spindle transmission device comprising:

a linear rail assembly, which is mounted to the vertical column and comprises two linear rails that extend in the up-down direction and are parallel with and spaced from each other in a left-right direction;

a first slide seat, which is slidably mounted to the linear rail assembly to receive the first spindle to mount thereto and comprises a first right slide block assembly and a first left slide block assembly respectively in slidable engagement with the linear rails and each comprising a plurality of first slide blocks;

a second slide seat, which extends in the left-right direction across the first slide seat and is slidably mounted to the linear rail assembly in a manner of being spaced from the first slide seat to receive the second spindle to mount thereto and comprises a second right slide block assembly and a second left slide block assembly respectively in slidable engagement with the linear rails and each comprising a plurality of second slide blocks;

a first power unit, which is mounted to the vertical column to drive the first slide seat to move in the up-down direction; and a second power unit, which is mounted to the vertical column to drive the second slide seat to move in the up-down direction;

wherein the first and second right slide block assemblies are set in slidable engagement with one of the linear rails located at right side and the first and second left slide block assemblies are set in slidable engagement with one of the linear rails located at left side; and a spacing distance between the first slide blocks is different from a spacing distance between the second slide blocks that are in slidable engagement with the same one of the linear rails and the first and second slide blocks are alternate with each other in the up-down direction.

2. The CNC dual-spindle transmission device according to claim 1, wherein the first slide seat comprises a first seat body to which the first spindle is mounted, a first right fixing section that extends from the first seat body to a location frontward of the one of the linear rails that is located at the right side and receives the first right slide block assembly to be fixedly mounted thereto, two first left fixing sections that extend from the first seat body to locations frontward of the one of the linear rails that is located at the left side and respectively receive the first slide blocks of the first left slide block assembly to be fixedly mounted thereto, and a through hole that is formed in and extends in the left-right direction through the first seat body to be located between the first left fixing sections; and the second slide seat comprises a second seat body to which the second spindle is mounted and which is spaced from the first seat body in the left-right direction, two second right fixing sections that extend from the second seat body to locations frontward of the one of the linear rails that is located at the right side and respectively receive the second slide blocks of the second right slide block assembly to be fixedly mounted thereto, and a first left fixing section that extends from the second seat body through the through hole of the first slide seat to a location frontward of the one of the linear rails that is located at the left side and receives the first left slide block assembly to be fixedly mounted thereto, wherein the first right fixing section is located between the second right fixing sections; the second left fixing section is located between the first left fixing sections; and a correction gap is formed between the first and second right fixing sections that are adjacent to each other and between the first and second left fixing sections that are adjacent to each other.

3. The CNC dual-spindle transmission device according to claim 1, wherein the first slide seat comprises a first seat body to which the first spindle is mounted, a first right fixing section that extends from the first seat body to a location frontward of the one of the linear rails that is located at the right side and receives the first right slide block assembly to be fixedly mounted thereto, and two first left fixing sections that extend from the first seat body to locations frontward of the one of the linear rails that is located at the left side and respectively receive the first slide blocks of the first left slide block assembly to be fixedly mounted thereto; the second slide seat comprises a second seat body to which the second spindle is mounted and which is spaced from the first seat body in a front-rear direction, two second right fixing sections that extend from the second seat body to locations frontward of the one of the linear rails that is located at the right side and respectively receive the second slide blocks of the second right slide block assembly to be fixedly mounted thereto, and a first left fixing section that extends from the first seat body to a location frontward of the one of the linear rails that is located at the left side and receives the first left slide block assembly to be fixedly mounted thereto, wherein the first right fixing section is located between the second right fixing sections; the second left fixing section is located between the first left fixing sections; and a correction gap is formed between the first and second right fixing sections that are adjacent to each other and between the first and second left fixing sections that are adjacent to each other.

4. The CNC dual-spindle transmission device according to claim 3, wherein the first slide seat further comprises an extend-through hole that is formed in and extends in the front-rear direction through the first seat body and the second slide seat further comprises an extend-through hole that is formed in and extends in the front-rear direction through the second seat body, wherein the first spindle extends in the front-rear direction through the extend-through hole of the second slide seat and the second spindle extends in the front-rear direction through the extend-through hole of the first slide seat.

5. The CNC dual-spindle transmission device according to claim 2, wherein the first slide seat and the second slide seat are each integrally formed.

6. The CNC dual-spindle transmission device according to claim 3, wherein the first slide seat and the second slide seat are each integrally formed.

7. The CNC dual-spindle transmission device according to claim 1, wherein the first power unit comprises a first servo motor and a first bearing seat that are spaced from each other, a first screw that is coupled between the first servo motor and the first bearing seat and is driven by the first servo motor, and a first nut that couples the first screw to the first seat body; and the second power unit comprises a second servo motor and a second bearing seat that are spaced from each other, a second screw that is coupled between the second servo motor and the second bearing seat and is driven by the second servo motor, and a second nut that couples the second screw to the second seat body.

8. The CNC dual-spindle transmission device according to claim 2, wherein the first power unit comprises a first servo motor and a first bearing seat that are spaced from each other, a first screw that is coupled between the first servo motor and the first bearing seat and is driven by the first servo motor, and a first nut that couples the first screw to the first seat body; and the second power unit comprises a second servo motor and a second bearing seat that are spaced from each other, a second screw that is coupled between the second servo motor and the second bearing seat and is driven by the second servo motor, and a second nut that couples the second screw to the second seat body.

9. The CNC dual-spindle transmission device according to claim 3, wherein the first power unit comprises a first servo motor and a first bearing seat that are spaced from each other, a first screw that is coupled between the first servo motor and the first bearing seat and is driven by the first servo motor, and a first nut that couples the first screw to the first seat body; and the second power unit comprises a second servo motor and a second bearing seat that are spaced from each other, a second screw that is coupled between the second servo motor and the second bearing seat and is driven by the second servo motor, and a second nut that couples the second screw to the second seat body.

10. The CNC dual-spindle transmission device according to claim 4, wherein the first power unit comprises a first servo motor and a first bearing seat that are spaced from each other, a first screw that is coupled between the first servo motor and the first bearing seat and is driven by the first servo motor, and a first nut that couples the first screw to the first seat body; and the second power unit comprises a second servo motor and a second bearing seat that are spaced from each other, a second screw that is coupled between the second servo motor and the second bearing seat and is driven by the second servo motor, and a second nut that couples the second screw to the second seat body.

* * * * *